(12) United States Patent
Steckel

(10) Patent No.: US 9,198,244 B2
(45) Date of Patent: Nov. 24, 2015

(54) LUMINOUS DEVICE FOR A VEHICLE

(71) Applicant: Lisa Dräxlmaier GmbH, Vilsbiburg (DE)

(72) Inventor: Michael Steckel, Vilsbiburg (DE)

(73) Assignee: Lisa Dräxlmaier GmbH, Vilsbiburg (DE)

(\*) Notice: Subject to any disclaimer, the term of this patent is extended or adjusted under 35 U.S.C. 154(b) by 0 days.

(21) Appl. No.: 14/293,538

(22) Filed: Jun. 2, 2014

(65) Prior Publication Data

US 2014/0354152 A1  Dec. 4, 2014

(30) Foreign Application Priority Data

Jun. 3, 2013 (DE) .......................... 10 2013 210 261

(51) Int. Cl.
*B60Q 1/14* (2006.01)
*H05B 33/08* (2006.01)

(52) U.S. Cl.
CPC ........ *H05B 33/0815* (2013.01); *H05B 33/0827* (2013.01); *H05B 33/0866* (2013.01); *Y02B 20/42* (2013.01)

(58) Field of Classification Search
USPC ....................... 315/77, 82, 224, 246, 294, 297
See application file for complete search history.

(56) References Cited

U.S. PATENT DOCUMENTS

| | | | |
|---|---|---|---|
| 2004/0155600 A1* | 8/2004 | Lin et al. ........................ | 315/272 |
| 2006/0244396 A1* | 11/2006 | Bucur ............................ | 315/312 |
| 2008/0192499 A1* | 8/2008 | Gardner et al. ................ | 362/488 |
| 2009/0079363 A1* | 3/2009 | Ghoman et al. ............... | 315/294 |
| 2011/0025215 A1* | 2/2011 | Hulett ........................ | 315/185 R |
| 2012/0049760 A1* | 3/2012 | Dennis et al. .................. | 315/294 |

FOREIGN PATENT DOCUMENTS

| | | |
|---|---|---|
| DE | 19602891 A1 | 8/1997 |
| DE | 102011103446 A1 | 3/2012 |

\* cited by examiner

*Primary Examiner* — Tung X Le
(74) *Attorney, Agent, or Firm* — Finnegan, Henderson, Farabow, Garrett & Dunner LLP

(57) ABSTRACT

A luminous device for a vehicle includes a plurality of light-emitting diodes, a series resistor connecting the plurality of light-emitting diodes to a voltage source, and a control unit configured to control the light-emitting diodes by means of pulse widths modulation (PWM).

9 Claims, 3 Drawing Sheets

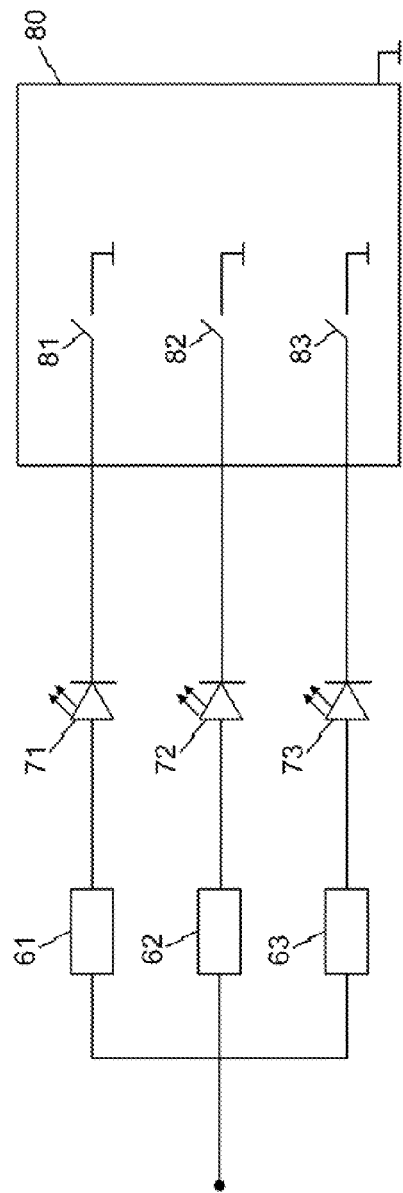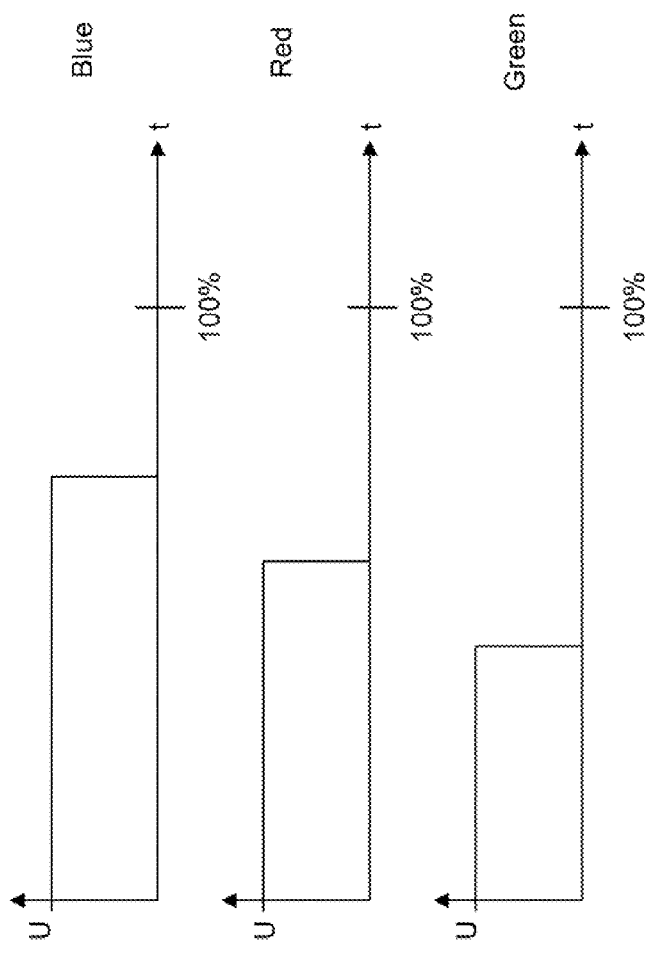

LUMINOUS DEVICE FOR A VEHICLE

CROSS-REFERENCE TO RELATED APPLICATIONS

This application is based upon and claims the benefit of prior German Application No. 10 2013 210 261.5, filed on Jun. 3, 2013, the entire contents of which are incorporated herein by reference.

TECHNICAL FIELD

The disclosure relates to a luminous device for a vehicle and a method for controlling a luminous device for a vehicle.

BACKGROUND OF THE DISCLOSURE

Ambient lighting (interior lighting) by means of light-emitting diodes (LEDs) has gained a foothold in modern motor vehicles. This type of lighting is realized with luminous devices that can emit multi-colored light. In a luminous device of this type, one or a plurality of differently colored LEDs are arranged on a printed circuit board so that the varying intensity of the illumination results in secondary colors. The varying intensity of the illumination is caused by a varying current feed of the individual LEDs.

An example of multi-colored LEDs is so-called red-green-blue (RGB) LEDs. In the RGB LEDs, different chips are arranged in a housing. The current passing through the LEDs and/or the chips is limited by the use of series resistors if the current supply is realized by a fixed voltage, such as a vehicle electrical system voltage, for example. In addition, the brightness of each individual chip can be dimmed by a pulse widths modulation (PWM) of the supply voltage.

FIG. 1 shows a configuration of a luminous device according to the conventional technology. The luminous device includes three LEDs 71, 72, and 73. Furthermore, the luminous device includes series resistors 61, 62 and 63, each of which is connected to one of LED 71, 72 and 73 in series. The series resistors adapt the supply voltage to the forward bias of the LEDs. Furthermore, the luminous device includes a micro controller 80, which includes switches 81, 82, and 83. By switching the switches 81, 82, or 83 on or off, the supply voltage can be modulated for each LED by modulating the pulse widths.

With modern ambient lightings, the brightness is adapted with a microcontroller in combination with an LED driver at the actual RGB-LED on one and the same printed circuit board. In that case, an RGB-luminous printed circuit board is a full control device. In a normal case, there are a plurality of such luminous printed circuit boards in a vehicle (up to 45). In some vehicles, the printed circuit boards are connected via a data bus (such as a local interconnect network (LIN), for example). This facilitates an individual response of each individual printed circuit board so that, depending on the driving situation, individual printed circuit boards can change their color and/or intensity.

FIG. 2 shows a PWM control of the LEDs 71, 72, and 73 according to conventional technology. The PWM control shown in FIG. 2 generates a secondary color. The PWM control signals for the LEDs start at the beginning of a PWM period and have different lengths of time.

Because of the multiplicity of LEDs installed in modern vehicles, the size of the printed circuit board plays an important role. In particular, the printed circuit board should be dimensioned as small as possible. This is also done for the purpose of further cost efficiency.

SUMMARY

One object of the disclosed embodiments is to provide a small and cost-efficient luminous device for a vehicle. Another object of the disclosed embodiments is to provide a luminous device that can keep the brightness of the emitted light constant regardless of the adjusted color.

These objects are achieved with a device having the characteristics consistent with embodiments of the disclosure.

According to the disclosure, a luminous device for a vehicle includes a plurality of light-emitting diodes (LEDs), a series resistor that connects the plurality of light-emitting diodes to a voltage source, and a control unit that is set up to control the light-emitting diodes by means of pulse widths modulation (PWM), in order to output PWM control signals for the light-emitting diodes one after another within a period, and in order to vary pulse widths of the PWM control signals for the light-emitting diodes. By using only one series resistor for a plurality of light-emitting diodes, the dimensions of the luminous device can be kept small. Furthermore, the brightness can be kept constant with only one series resistor regardless of the adjusted color because the PWM control signals for the light-emitting diodes are outputted one after another within a period and the pulse widths of the PWM control signals for the light-emitting diodes are varied.

For example, the light-emitting diodes, the series resistor, and the control unit are arranged on one printed circuit board. Accordingly, the luminous device is arranged in a space-efficient manner in a single component.

In some embodiments, the luminous device is used in the interior of the vehicle.

In some embodiments, the light-emitting diodes each radiate different colors and have different forward voltages. This is the case, for example, with RGB LEDs.

In some embodiments, the pulse width of the PWM control signal for the light-emitting diode with the lowest maximum brightness is set to the total time length of the period. For example, with the RGB LEDs, the blue LED is the LED with the lowest maximum brightness.

In some embodiments, the total of pulse widths of the light-emitting diodes radiating various colors is smaller than the period when only one color is radiated. Therefore, the brightness of the various colors can be kept constant. This allows for a better color resolution.

In some embodiments, a frequency of the PWM control signals is constant. This also contributes to a simple construction of the luminous device.

In some embodiments, three light-emitting diodes are arranged on a printed circuit board. This is the case with the RGB LEDs, for example.

In some embodiments, the plurality of light-emitting diodes are separated into several groups that are connected by a data bus. Accordingly, each group of light-emitting diodes can be triggered separately, for example to have an individual color and/or brightness. Likewise, all groups can be triggered together.

According to the disclosure, a method for controlling a luminous device for a vehicle is also provided, with the luminous device including a plurality of light-emitting diodes, a series resistor that connects the plurality of light-emitting diodes to a voltage source, and a control unit set up to control the light-emitting diodes by means of pulse widths modulation. The method includes outputting PWM control signals for the light-emitting diodes one after another within a period and varying pulse widths of the PWM control signals for the light-emitting diodes.

BRIEF DESCRIPTION OF THE DRAWINGS

FIG. 1 schematically shows a luminous device according to conventional technology.

FIG. 2 schematically shows a PWM control of a luminous device according to conventional technology.

DESCRIPTION OF THE EMBODIMENTS

Embodiments of the disclosure are described in detail in the following with reference to the accompanying drawings. However, it is noted that the following description contains only examples and should not be considered as limiting the invention.

Figure 3:
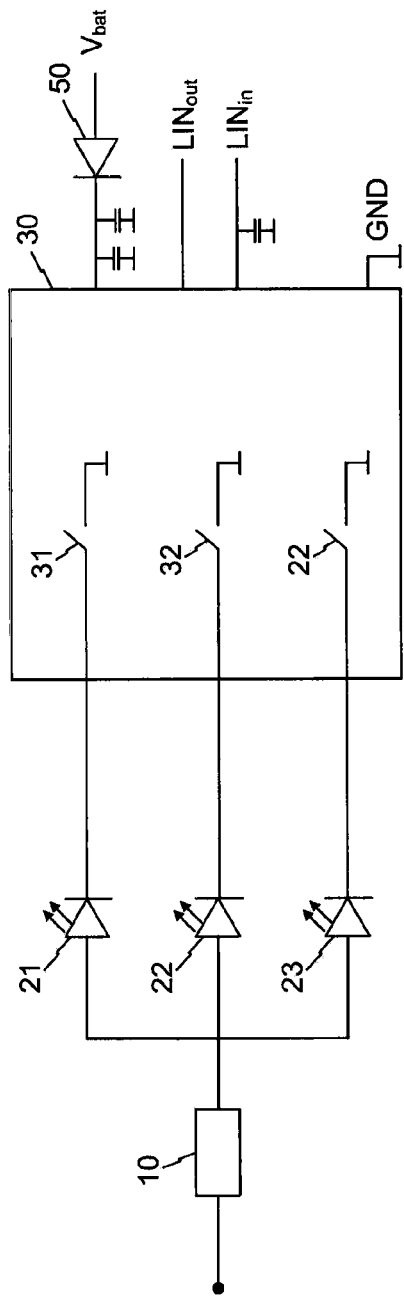
FIG. 3 schematically shows a luminous device for a vehicle according to an exemplary embodiment.

FIG. 3 schematically shows an exemplary luminous device for a vehicle consistent with embodiments of the disclosure. The luminous device includes three light-emitting diodes 21, 22, and 23. For example, the light-emitting diode 21 is a blue LED, the light-emitting diode 22 is a red LED, and the light-emitting diode 23 is a green LED. Furthermore, the luminous device includes a series resistor that connects the plurality of light-emitting diodes to a voltage source. The voltage source may be a motor vehicle battery of a vehicle electrical system, for example, which supplies a voltage of 12V.

Furthermore, the luminous device includes a control unit 30. The control unit 30 is supplied with the battery voltage $V_{bat}$. Such a voltage supply is provided via an inverse-polarity protection 50. The control unit 30 is furthermore connected to a local interconnection network bus (LIN-bus). Via the LIN-bus, the control unit 30 receives setting values, for example for the brightness and/or the color of the light to be emitted by the luminous device. Furthermore, the control unit 30 is connected to ground GND.

The control unit 30 controls the light-emitting diodes 21, 22, and 23 by means of pulse widths modulation (PWM). To that end, the control unit 30 includes switches 31, 32, and 33. The switches 31, 32, and 33 may include semiconductor switches, such as metal-oxide-semiconductor field-effect transistor (MOSFETs), for example.

The control unit 30, for example, includes a micro controller (μC) to allow for a compact construction of the luminous device. For the same purpose, the light-emitting diodes 21, 22, and 23, the series resistor 10, and the control unit are arranged on one printed circuit board.

The luminous device can be used in particular for lighting the interior of a vehicle. In that case, a plurality of luminous devices can be arranged in the interior of the vehicle and controlled individually by means of the LIN-bus.

According to the disclosure, one series resistor is used for all three light-emitting diodes 21, 22, and 23, rather than a series resistor for each LED as in conventional technology (see FIG. 1).

An important aspect of the ambient lighting in a vehicle is a constant brightness, regardless of the color that is set. At the same current, the blue LED 21 emits the least brightness and therefore represents the worse case. Any other generated color will be brighter at the same current, or will be the same brightness with less current. The use of one single series resistor for all light-emitting diodes therefore has an effect on the PWM control, and therefore the PWM control needs to be specifically designed.

Because of the correlation between current and brightness described above, the luminous device is designed based on the light-emitting diode with the lowest maximum brightness or the greatest forward bias. This can be the blue LED, for example.

Figure 4:
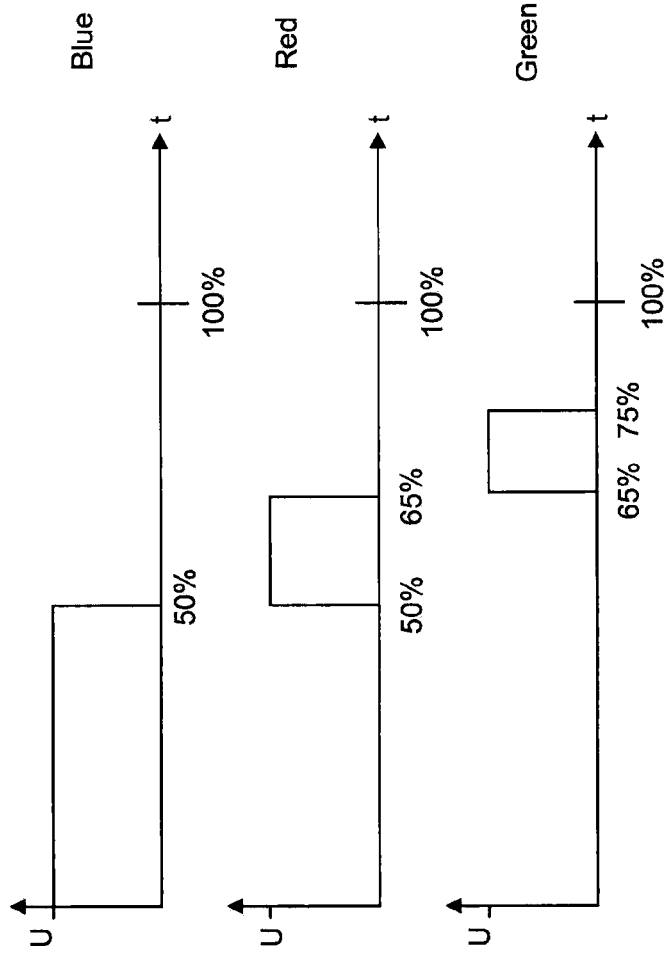
FIG. 4 schematically shows PWM control signals according to an exemplary embodiment.

FIG. 4 shows a PWM control of the light-emitting diodes 21, 22, and 23. In particular, FIG. 4 shows the temporal distribution of the PWM control signals for the respective LEDs. In FIG. 4, 100% on the X-axis corresponds to the length of a PWM cycle and/or a period. The temporal length of such a period can be 0.1 ms, for example. The other percentages show how long a light-emitting diode is triggered within a PWM cycle. The percentage information describes in particular the pulse duty cycle of the PWM control signals. The duty cycle is defined as the quotient of the impulse length by the period length.

Because the luminous device is designed based on the blue LED, the maximum brightness of the luminous device is defined by a 100% triggering of the blue LED. To generate any other color (secondary color), the pulse width of the blue LED is reduced and the pulse widths of the other LEDs are increased. Because constant brightness is required, the total of the individual pulse widths of the LEDs (red, green and blue) is always less than 100%.

FIG. 4 furthermore shows that the diodes 21, 22, and 23 are triggered one after another. In particular, the PWM control signals for the light-emitting diodes 21, 22, and 23 do not overlap. If the PWM control signals are started one after another, the series resistor of the blue LED (which is designed based on the worse case) can also be used in a secondary color for the other LEDs. Because the total current for all three LEDs is always smaller than the worse case (i.e., when the blue LED is trigged by 100%), the maximum loss performance of the remaining resistance does not have to be adapted (increased). Here too, the maximum loss performance occurs in the worse case. Therefore, the same resistor that was dimensioned for the blue LED can be used for all three LEDs. This not only reduces the cost (resistor, assembly, AOI test, etc.) but moreover also requires less construction space on the printed circuit board. Because luminous printed circuit boards are by nature very small (such as 8×11 mm, for example), this represents a significant advantage in addition to the reduced cost.

Furthermore, the luminous device according to embodiments of the disclosure is characterized in that the PWM control is performed dynamically. In particular, the pulse widths of the PWM control signals can be dynamically varied for the luminous diodes. The pulse widths are limited only in that a constant brightness is achieved. In particular, no specific time segment is assigned to the individual LEDs within a period. This means that a greater dynamic of the luminous device can be achieved and a greater number of colors can be represented. In particular, the pulse widths can be randomly varied in various PWM cycles.

Figure 5:
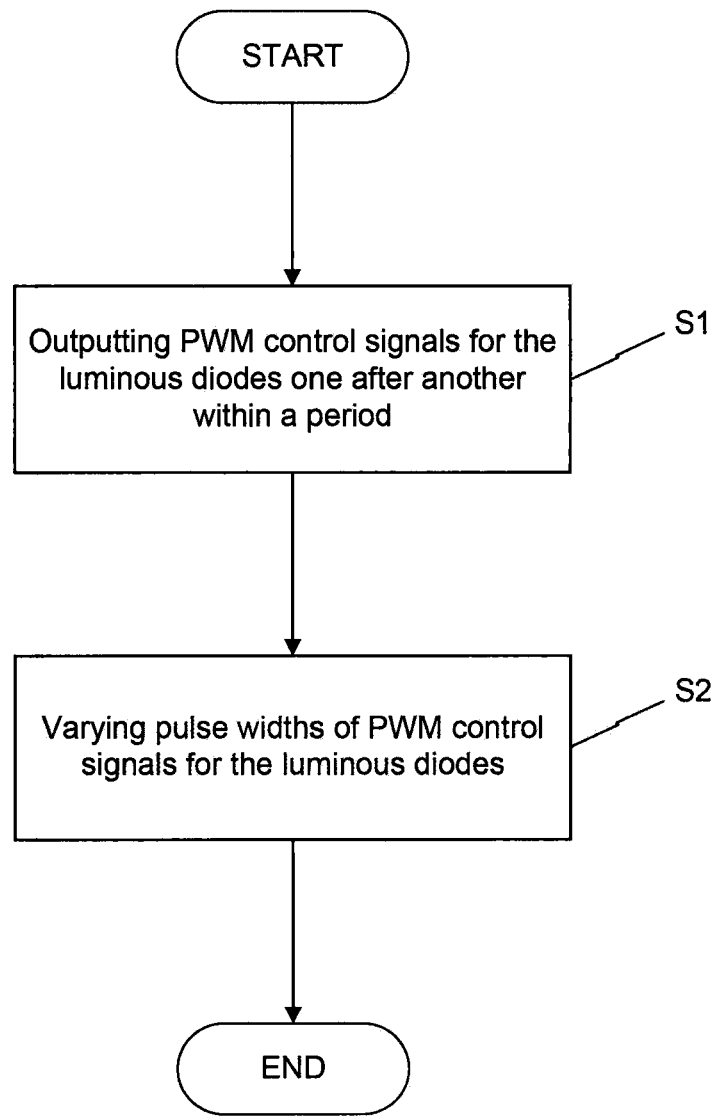
FIG. 5 shows a method for controlling a luminous device in a vehicle according to an exemplary embodiment.

FIG. 5 shows an exemplary method for controlling a luminous device for a vehicle consistent with embodiments of the disclosure. The luminous device includes a plurality of light-emitting diodes, a series resistor that connects the plurality of light-emitting diodes to a voltage source, and a control unit that is set up to control the light-emitting diodes by means of pulse widths modulation. In particular, the method includes S1 to output PWM control signals for the light-emitting diodes one after another within a period. Furthermore, the method includes S2 to vary the pulse widths of the PWM control signals for the light-emitting diodes. Further modifications and variations of the method will be apparent to one of ordinary skill in the art from the above-descriptions of the device.

In the previous description, the luminous device has been described as part of a vehicle, in particular a motor vehicle. However, it is clear that the concept of the device according to the disclosure is also applicable in other environments where an illumination with various colors and constant brightness is needed.

In particular, one skilled in the art would realize that various modifications and variations of the device and the method according to the disclosure can be performed without departing from the scope of the disclosure.

Furthermore, the disclosure has been described with reference to specific examples, which are used for the purpose of better understanding the disclosure, but are not intended to limit the disclosure. One skilled in the art would recognize instantly that many different combinations of the elements can be used. The scope of the invention is characterized by the following claims.

What is claimed is:

1. A luminous device for a vehicle, comprising:
   a plurality of light-emitting diodes, configured to radiate different colors at different maximum brightnesses;
   a series resistor connecting the plurality of light-emitting diodes to a voltage source; and
   a control unit configured to:
     output pulse widths modulation (PWM) control signals one after another within a period, each of the PWM control signals controlling one of the light-emitting diodes, and
     vary pulse widths of the PWM control signals for the light-emitting diodes,
     wherein a total time length of the period equals a reference pulse width of the PWM control signal for the light-emitting diode with a lowest maximum brightness when only the light-emitting diode with the lowest maximum brightness radiates within the period.

2. The luminous device according to claim 1, wherein the light-emitting diodes, the series resistor, and the control unit are arranged on one printed circuit board.

3. The luminous device according to one of claim 1, wherein the luminous device is located in an interior of a vehicle.

4. The luminous device according to claim 1, wherein the light-emitting diodes have different forward biases.

5. The luminous device according to claim 1, wherein the plurality of light-emitting diodes include three light-emitting diodes arranged on one printed circuit board.

6. The luminous device according to claim 1, wherein the plurality of light-emitting diodes are divided into several groups connected by a data bus.

7. A method for controlling a luminous device for a vehicle, the luminous device including a plurality of light-emitting diodes configured to radiate different colors at different maximum brightnesses, a series resistor connecting the plurality of light-emitting diodes to a voltage source, and a control unit configured to control the light-emitting diodes by means of pulse widths modulation (PWM), the method comprising:
   outputting PWM control signals for the light-emitting diodes one after another within a period; and
   varying pulse widths of the PWM control signals for the light-emitting diodes,
   wherein a total time length of the period equals a reference pulse width of the PWM control signal for the light-emitting diode with a lowest maximum brightness when only the light-emitting diode with the lowest maximum brightness radiates within the period.

8. The method according to claim 7, wherein:
   varying the pulse widths of the PWM control signals includes restricting a total of the pulse widths to be smaller than the period.

9. The method according to claim 7, wherein outputting the PWM control signals includes keeping a frequency of the PWM control signals constant.

* * * * *